(12) United States Patent
Chole et al.

(10) Patent No.: US 11,983,616 B2
(45) Date of Patent: May 14, 2024

(54) METHODS AND APPARATUS FOR CONSTRUCTING DIGITAL CIRCUITS FOR PERFORMING MATRIX OPERATIONS

(71) Applicant: Expedera, Inc., Santa Clara, CA (US)

(72) Inventors: Sharad Vasantrao Chole, San Jose, CA (US); Shang-Tse Chuang, Los Altos, CA (US); Siyad Chih-Hua Ma, Palo Alto, CA (US)

(73) Assignee: Expedera, Inc., Santa Clara, CA (US)

( * ) Notice: Subject to any disclaimer, the term of this patent is extended or adjusted under 35 U.S.C. 154(b) by 962 days.

(21) Appl. No.: 16/149,054

(22) Filed: Oct. 1, 2018

(65) Prior Publication Data
US 2020/0104669 A1    Apr. 2, 2020

(51) Int. Cl.
| | |
|---|---|
| *G06N 3/04* | (2006.01) |
| *G06F 9/345* | (2018.01) |
| *G06F 9/38* | (2018.01) |
| *G06F 17/16* | (2006.01) |
| *G06N 3/08* | (2006.01) |
| *G06N 3/084* | (2023.01) |

(52) U.S. Cl.
CPC ............... *G06N 3/04* (2013.01); *G06F 9/345* (2013.01); *G06F 17/16* (2013.01); *G06N 3/084* (2013.01); *G06F 9/3877* (2013.01)

(58) Field of Classification Search
CPC ........ G06N 3/04; G06N 3/084; G06F 9/3001; G06F 9/30036; G06F 9/345; G06F 9/3885; G06F 17/16
See application file for complete search history.

(56) References Cited

U.S. PATENT DOCUMENTS

| | | | | |
|---|---|---|---|---|
| 10,474,464 | B2* | 11/2019 | Qadeer | ................... G06N 3/063 |
| 10,795,678 | B2* | 10/2020 | Fowers | ............... G06F 9/30036 |
| 10,891,538 | B2* | 1/2021 | Dally | .................... G06F 9/3001 |

OTHER PUBLICATIONS

Fowers, Jeremy, et al. "A configurable cloud-scale DNN processor for real-time AI." 2018 ACM/IEEE 45th Annual International Symposium on Computer Architecture (ISCA). IEEE, Jun. 2018. (Year: 2018).*

* cited by examiner

*Primary Examiner* — Benjamin P Geib
(74) *Attorney, Agent, or Firm* — Carr & Ferrell LLP

(57) ABSTRACT

Artificial intelligence is an increasingly important sector of the computer industry. However, artificial intelligence is very computationally intensive field. Fortunately, many of the required calculations can be performed in parallel such that specialized processors can greatly increase computation performance. In particular, Graphics Processor Units (GPUs) are often used in artificial intelligence. Although GPUs have helped, they are not ideal for artificial intelligence. Specifically, GPUs are used to compute matrix operations in one direction with a pipelined architecture. However, artificial intelligence is a field that uses both forward propagation computations and back propagation calculations. To efficiently perform artificial intelligence calculations, a symmetric matrix processing element is introduced. The symmetric matrix processing element can perform forward propagation and backward propagation calculations just as easily. Furthermore, both of these calculations can be performed without reloading weight matrix values.

10 Claims, 13 Drawing Sheets

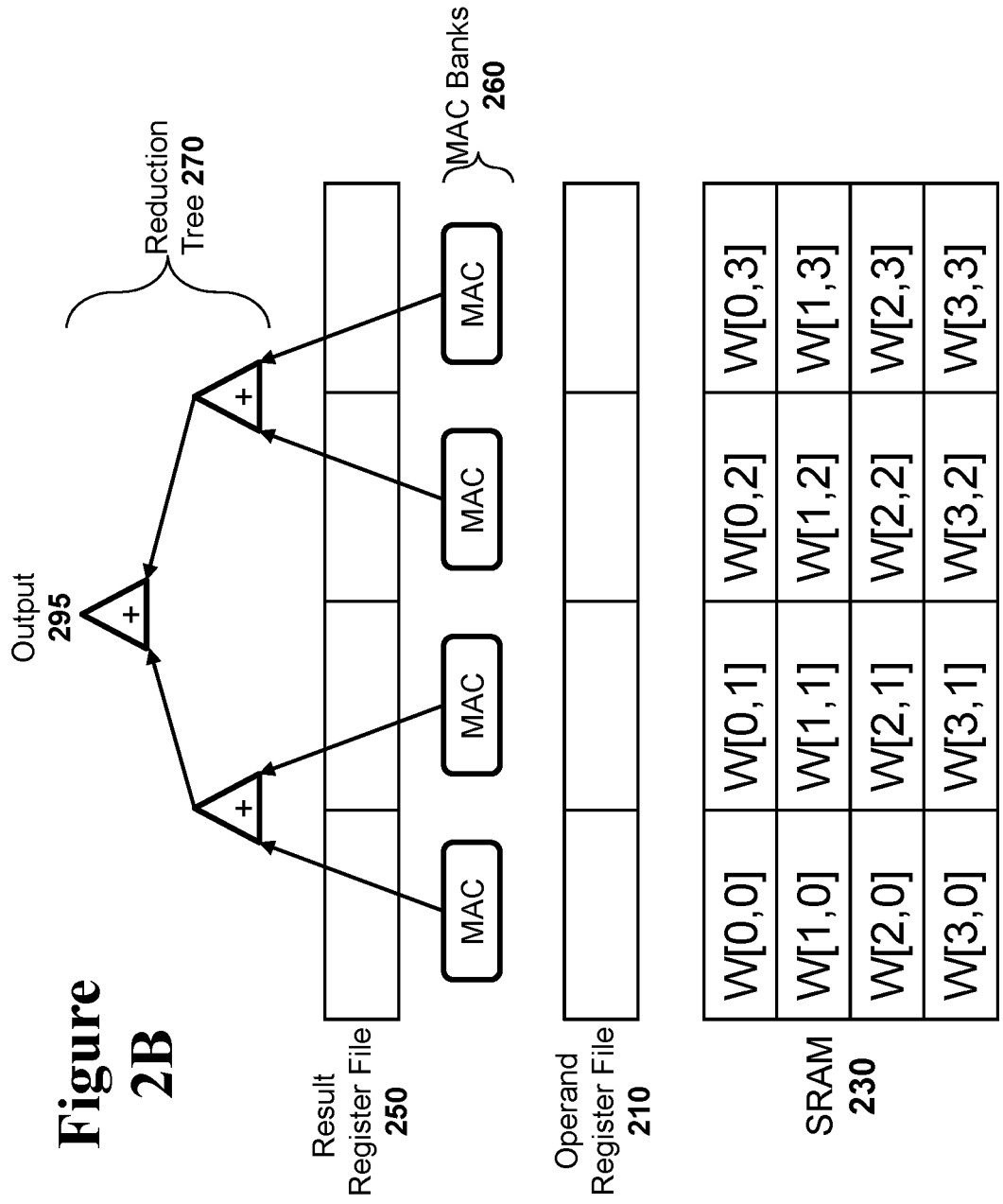

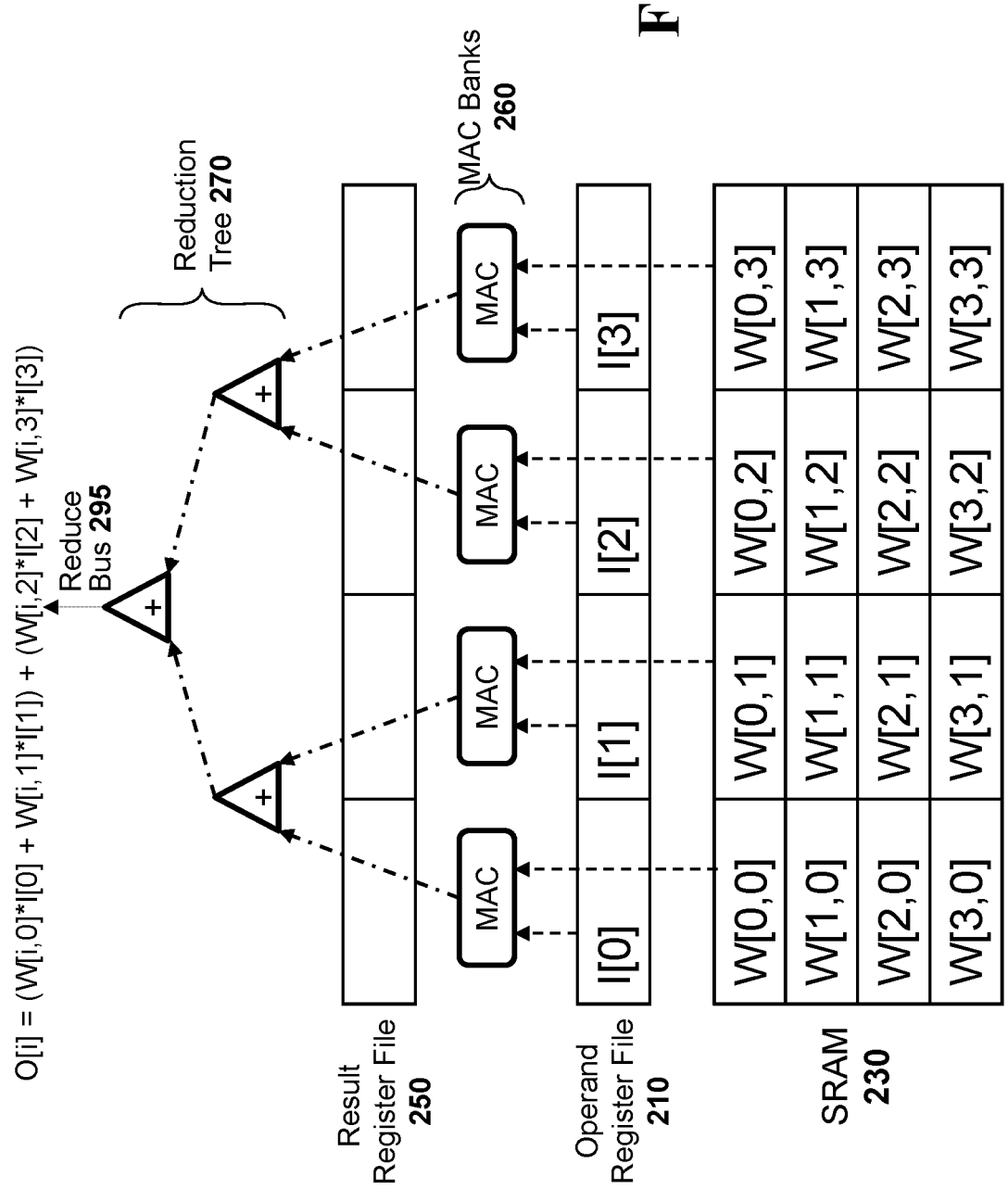

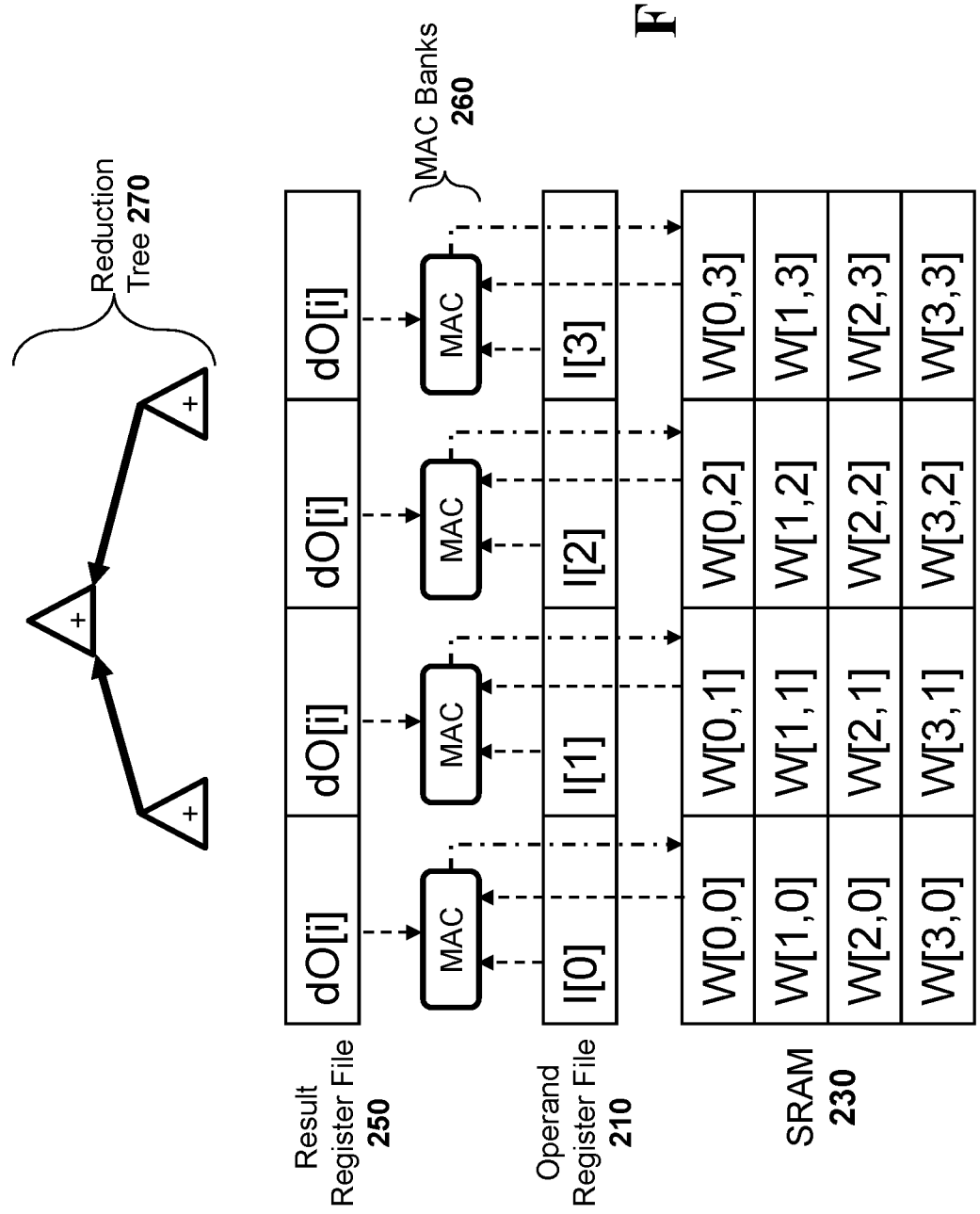

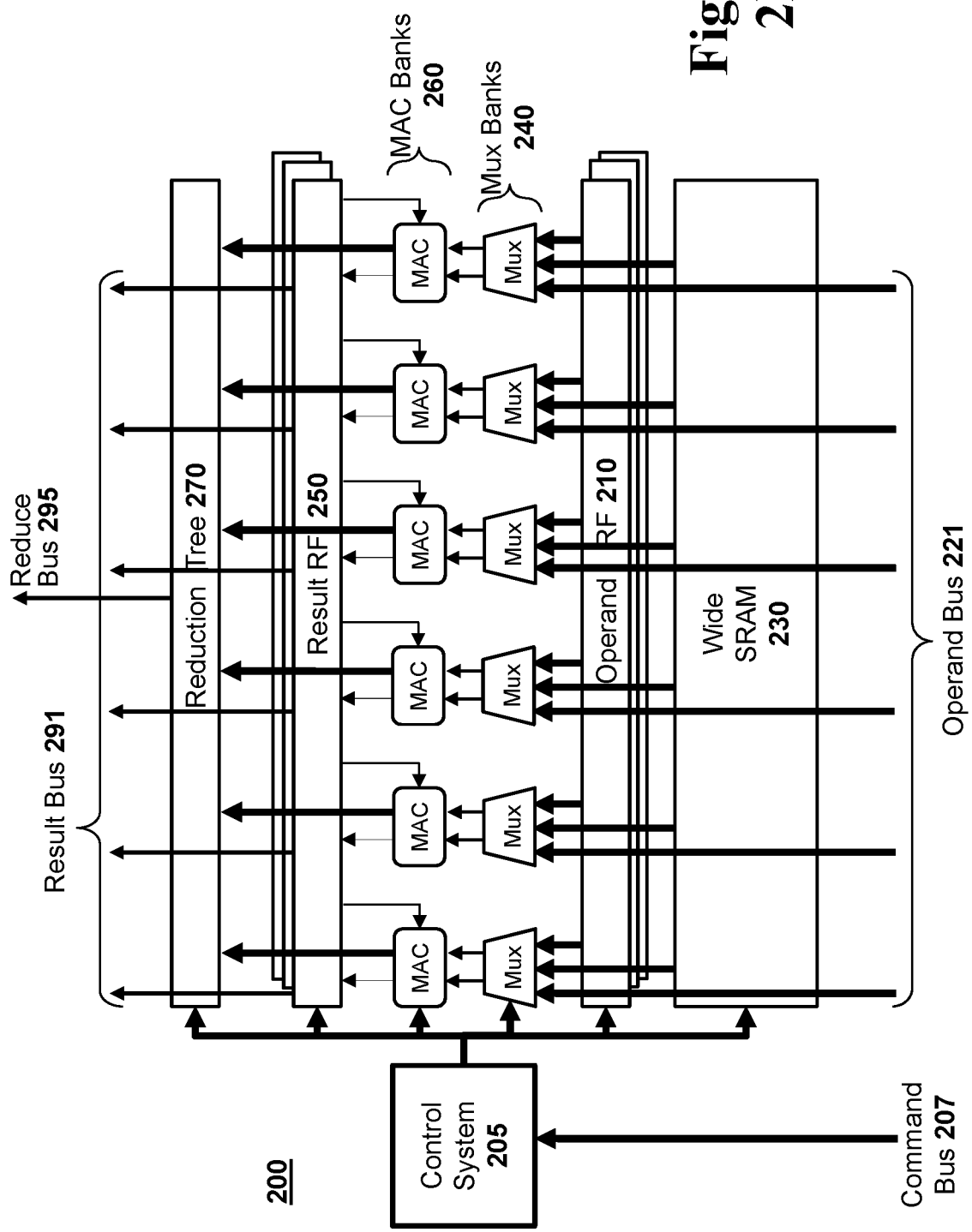

METHODS AND APPARATUS FOR CONSTRUCTING DIGITAL CIRCUITS FOR PERFORMING MATRIX OPERATIONS

The present invention relates to the field of digital processing circuits. In particular, but not by way of limitation, the present invention discloses techniques for designing and constructing processing digital circuits designed to efficiently perform matrix operations.

BACKGROUND

A typical computer system uses the traditional Von Neumann computer architecture. The Von Neumann computer architecture generally consists of an input/output unit for getting data into and out of the computer system, a memory unit for storing data within the system, an arithmetic and logic unit (ALU) for processing the data, and a control unit for repetitively moving data from the memory through ALU and back into the memory for processing the data in a controlled manner. With the traditional Von Neumann computer architecture, a computer system can perform any desired calculation by processing the data with the proper set of processing steps through the ALU.

Although the traditional Von Neumann computer architecture is extremely flexible in that it can ultimately perform any desired calculation, complex calculations may require extremely large numbers of sequential processing iterations. Specifically, each individual processing iteration step may require reading data from the memory, processing that data within the ALU and then writing the processed output data back to the memory system. Thus, complex calculations requiring extremely large numbers of sequential processing iterations wherein each iteration comprises several individual steps becomes very time consuming.

To reduce the time required to perform complex calculations, many specialized processors have been developed for handling specialized computing tasks. For example, high-speed digital signal processors (DSPs) have been developed for processing audio signals, communication signals, and other data that require specialized processing. One of the most popular types of specialized processor is a Graphics Processing Unit (GPU) used to render three-dimensional images. Almost every personal computer system now includes a Graphics Processing Unit to improve the speed and quality of visual displays. These specialized processors are optimized for specific tasks using various techniques such as parallelism, specialized ALU circuits, and proper data sizes.

One of the most popular types of specialized processing tasks now being heavily developed is in the field of Artificial Intelligence (AI). Artificial Intelligence is being used for image recognition, High-Performance Computing (HPC), scientific computing, machine learning, data-mining, speech recognition, and self-driving vehicles. Artificial Intelligence relies heavily upon matrix computations used to create artificial neural network (ANN).

Due to the heavy usage of matrix computations, artificial intelligence is a very computationally intensive field of computing. Thus, various techniques have been used to optimize computer systems for performing artificial intelligence computations. One of the most popular techniques is to use Graphical Processor Units (GPUs) that also perform matrix operations when rendering three-dimensional images. Similarly, specialized artificial intelligence processors have been created using Field Programmable Gate Arrays (FPGAs). However, even with these techniques, it remains very difficult to perform the complex calculations required for artificial intelligence. Therefore, it is desirable to further develop new processing techniques to further optimize the computational tasks associated with artificial intelligence.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 2B illustrates a conceptual diagram of the Symmetric Matrix Processing Element of FIG. 2A with a four-by-four weight matrix consisting of sixteen weight value elements W[0,0] to W[3,3] stored within the wide SRAM.

FIG. 2C illustrates a conceptual diagram of the Symmetric Matrix Processing Element of FIG. 2A performing a forward propagation calculation that may be used for artificial intelligence inferences.

FIG. 2E illustrates a conceptual diagram of the Symmetric Matrix Processing Element of FIG. 2A performing a weight matrix update.

FIG. 2F illustrates a diagram of an embodiment of the Symmetric Matrix Processing Element of FIG. 2A with a three entry deep operand register file and a three entry deep result register file.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although some of the example embodiments are disclosed with reference to matrix dot products, the teachings can be used for many other types of matrix operations. Thus, any digital system that performs matrix operations can benefit from the teachings of the present disclosure. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Neural Networks Overview

One of the core techniques in artificial intelligence (AI) is the use of artificial neural networks (ANNs). Artificial neural networks first learn from training data and then are later used to make logical inferences from new input data. Artificial neural networks were originally designed to be similar to the biological neuron networks in animal brains.

Figure 1A:
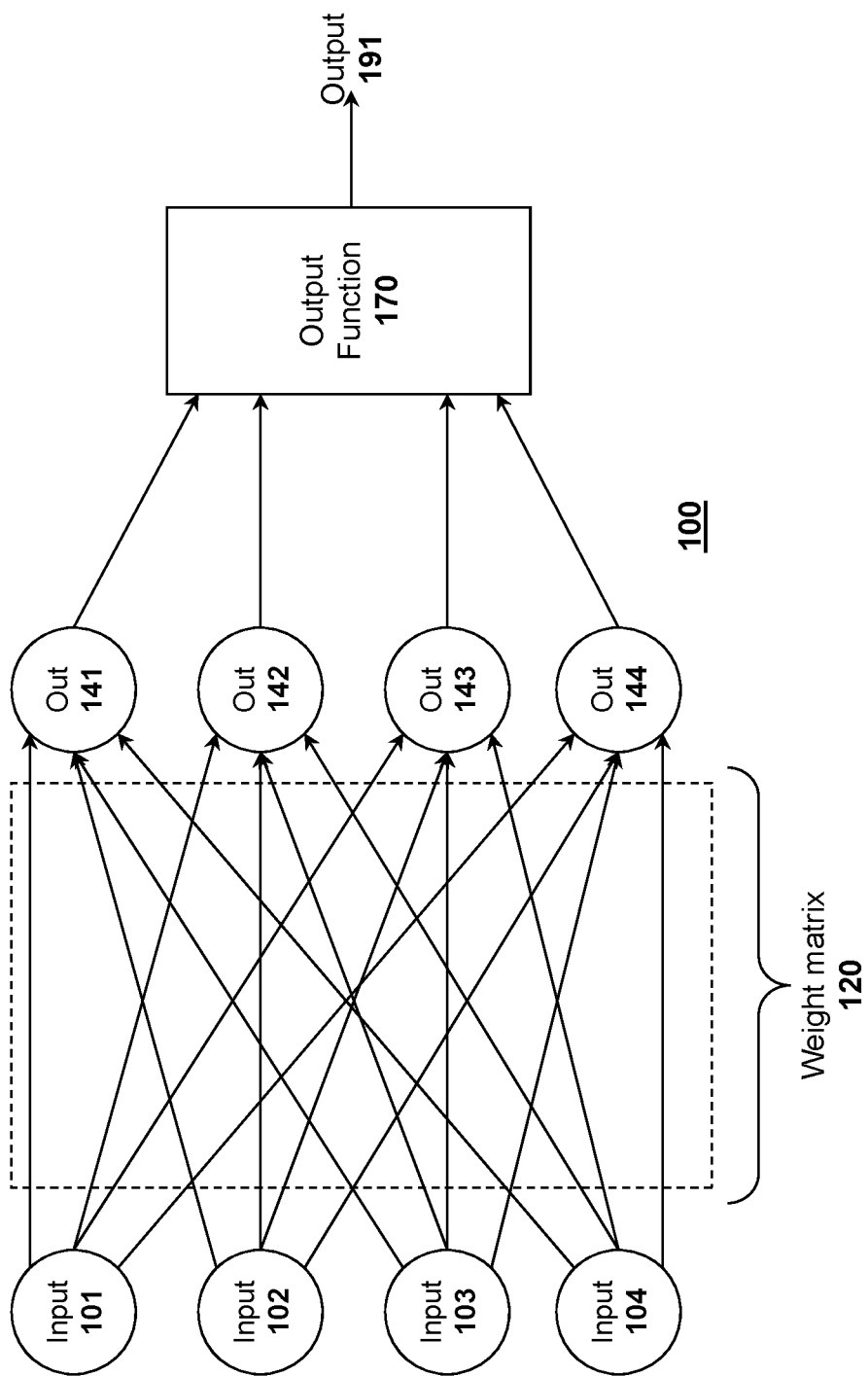
FIG. 1A illustrates a conceptual diagram of a single layer neural network.

FIG. 1A illustrates a conceptual diagram of a single-layer four-input artificial neural network 100. Referring to FIG. 1A, input data 101 to 104 are provided with training data during training sessions and then with new input data when the artificial neural network is used to make inferences. The input data (101 to 104) are processed with a weighted matrix 120 to create output data 141 to 144. Many different types of data processing may be performed using weighted matrix 120 (such as a Hadamard product, Frobenius inner product, matrix addition, etc.) however this document will focus upon the well-known matrix product. (Note that the techniques described in this document can be used with any of these other data processing operations.)

After processing the input data (101 to 104) with the weighted matrix 120 to create the output data 141 to 144, the output data 141 to 144 may be combined with an output function 170 to create a final output 191 for the artificial neural network 100. The output function 170 may be referred to as an activation function.

Note that the four-input artificial neural network of FIG. 1A illustrates just one small example of an artificial neural network. Artificial neural networks may be constructed much wider than just four inputs. Multiple different artificial neural networks may be used in parallel and their outputs may be combined.

Figure 1B:
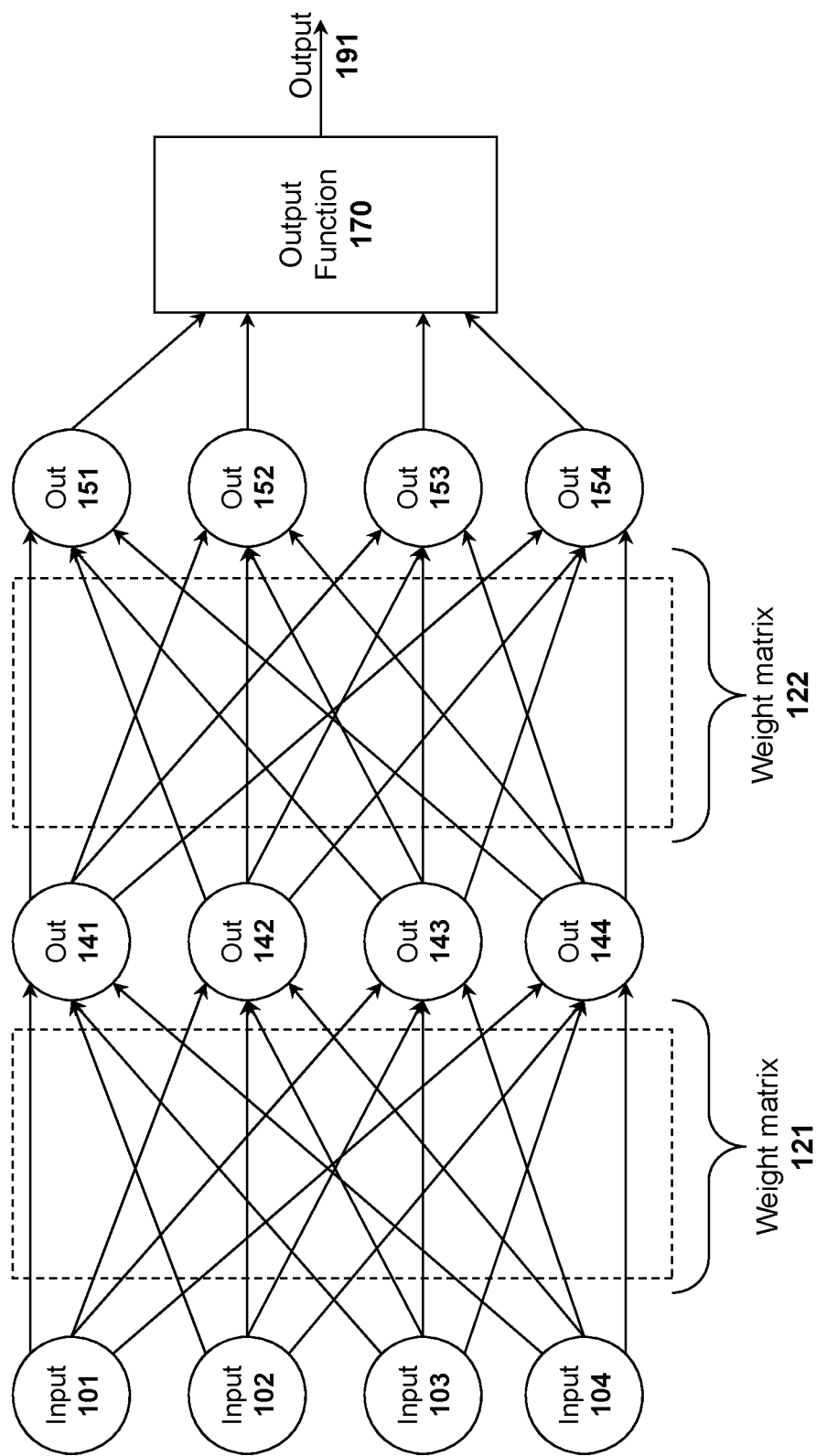
FIG. 1B illustrates a conceptual diagram of a double layer neural network.

Artificial neural networks may comprise many layers of weight matrices such that very complex analysis of the input data may be performed. For example, FIG. 1B illustrates a two-layer artificial neural network wherein the input data (101 to 104) is processed with a first weighted matrix 121 to create intermediate output data 141 to 144. Next, intermediate output data 141 to 144 is processed with a second weighted matrix 122 to create output data 151 to 154. Output data 151 to 154 may be processed by output function 170 to create a final output. Alternatively (or in addition to), the output data 151 to 154 may also be used as intermediate data that is fed into additional artificial neural network layers (not shown) such that very complex hierarchical artificial neural networks may be created.

Specialized Processors

As illustrated with reference to FIGS. 1A and 1B, artificial intelligence relies upon large amounts of computationally intensive matrix operations in order to initially learn using training data and later to draw inferences from a set of new input data. Fortunately, such matrix operations used in artificial neural network allow for many optimizations to be made since there is a significant amount of parallelism in the matrix computational tasks that are required. Thus, many special processors for artificial intelligence applications use a Single Instruction Multiple-Data (SIMD) architecture where wide data vectors are processed with each instruction such that matrix operations can be performed efficiently.

One specific computer application that also has a very high amount of inherent parallelism to be exploited and a large amount of demand is three-dimensional graphics rendering. Specifically, the high-speed rendering of three-dimensional scenes from geometric model data is used by video games, movie special effects, and computer aided design modelling systems. Thus, significant amounts of resources have already been invested into creating highly optimized Graphics Processing Units (GPUs) for rendering three-dimensional scenes.

Although Graphics Processing Units (GPUs) have largely been designed specifically for rendering three-dimensional images, GPUs have been used for many other applications that have similar computational requirements. For example, crypto-currency calculations, climate modelling, and artificial intelligence have all been able to benefit from the use Graphics Processing Units (GPUs) to reduce the amount of time required to obtain desired computational results.

Although the use of Graphics Processing Units (GPUs) has greatly improved the computational performance of artificial intelligence processing systems, Graphics Processing Units (GPUs) are not specifically optimized for artificial intelligence applications. To use Graphics Processing Units (GPUs) effectively, the sets of input data and weight matrices are run through a Graphics Processing Unit in batches. This works well to adapt the artificial intelligence processing tasks to the long-pipelined architecture of a Graphics Processing Unit such that the GPU is efficiently used. However, this introduces a significant amount of latency into the computations. In many applications, especially those wherein real-time results are needed, this significant amount of latency is unacceptable.

One specific problem with using Graphics Processing Units (GPUs) for artificial intelligence tasks is that Graphics Processing Units (GPUs) are generally designed to only process data in a single direction. Specifically, a Graphics Processing Units (GPUs) are designed to process geometric model data and parameters into a rendered three-dimensional image for output. Artificial intelligence generally requires two directions of data computations. In a first direction, inputs are processed with weighted matrices in an artificial neural network to generate outputs. This is used when attempting to make inferences. However, to do the learning necessary to improve the performance of the artificial neural network, back propagation is used to identify where errors are occurring. The error data is then used to update the weight values of the weight matrices in the artificial neural network. In this manner, the artificial neural network can continually improve and adjust itself in order to provide more accurate inferences.

In order to create highly optimized processing units specifically designed for artificial intelligence, many have opted to implement specialized artificial intelligence processors in Field Programmable Gate Arrays. By using Field Programmable Gate Arrays, a highly optimized processor may be designed for very specific artificial intelligence computation tasks. However, the size of Field Programmable Gate Arrays will limit how complex a specialized processor may be and/or how much internal memory it will have available for processing. Since artificial intelligence is very data intensive task, this may limit the performance of a FPGA based AI processor. Furthermore, all of the data to be processed must be moved into and out of the Field Programmable Gate Array based AI processor. Without specialized interfaces designed for very wide data transfers, a FPGA based AI processor may be limited by the input/output bandwidth of the FPGA device.

Symmetric Matrix Processing Element

To provide optimal processing for artificial intelligence tasks, this document discloses a Symmetric Matrix Processing Element that has been specifically designed to help optimize artificial intelligence computational tasks. The Symmetric Matrix Processing Element has been specifically designed in a manner to rapidly read input, output, and matrix weight data in parallel format for high throughput. And, more importantly, the Symmetric Matrix Processing Element has been designed to very efficiently process matrix data in both a forward direction and a backpropagation direction with equal efficiency hence the descriptor of "symmetric". In this manner, the weight matrix can be used for forward propagation inferences as well as for backpropagation artificial intelligence learning without requiring any reloading of the weight matrix data.

Figure 2A:
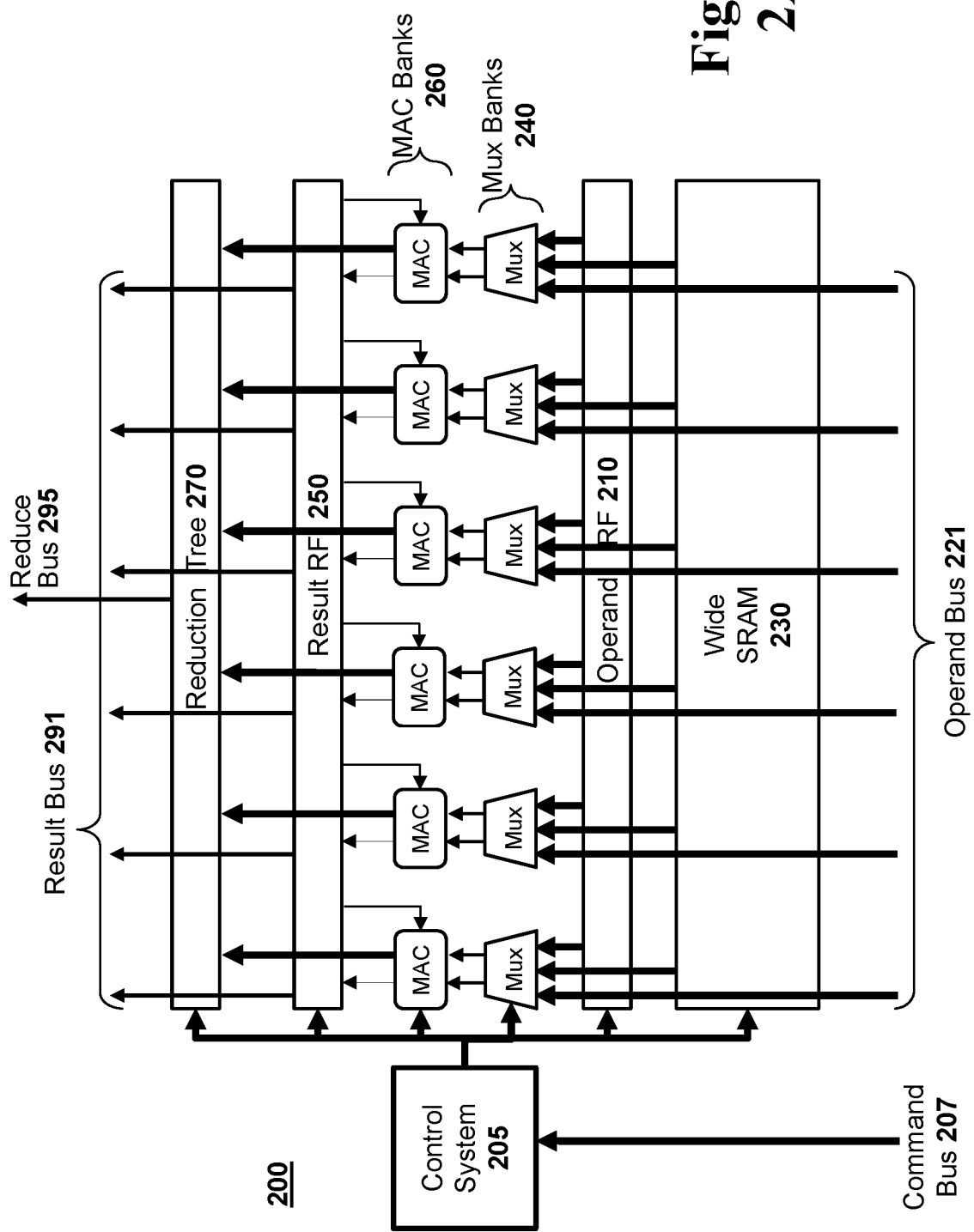
FIG. 2A illustrates a block diagram of a Symmetric Matrix Processing Element that may be used to perform matrix calculations.

FIG. 2A illustrates a block diagram of one embodiment of a Symmetric Matrix Processing Element 200 that handles six data elements in parallel. Note that Symmetric Matrix Processing Elements can be made with more or fewer data elements.

The Symmetric Matrix Processing Element 200 has access to a wide State Random Access Memory (SRAM) bank 230. The wide SRAM 230 is configured such that entire wide rows of data can be accessed in a single memory cycle. In this manner, an entire input vector or an entire row of weight values from a weight matrix can be read out from the wide SRAM 230 or written to the wide SRAM 230 in a single memory cycle. The Symmetric Matrix Processing Element 200 also includes an operand register file 210 for storing input data and other data that will be used as operands during computations.

The wide SRAM 230, the operand register file 210, and an operand bus 221 are coupled to a bank of multiplexors 240 that provide operand data to a bank 260 of Multiply And Accumulate (MAC) units (also referred to as a MAC bank 260). A control system 205 coupled to a command bus 207 controls all of these individual circuit elements to perform the required processing. Thus, control system 205 selects between data stored within the wide SRAM 230, data in the operand register file 210, and data an operand bus 221 to be provided to the bank 260 of MAC units for processing.

Results from the bank 260 of MAC units may be stored in result register file 250. These output results may be distributed in raw form in parallel using result bus 291. Alternatively (or in addition to the raw output data), the results in the result register file 250 may be combined with reduction tree 270 to provide a single output on reduce bus 295.

Note that for some operations the results stored in the result register file 250 may be used as an operand in another calculation. To handle this such calculations, there are data paths from the result register file 250 back to bank 260 of MAC units. Control system 205 is used to control exactly how the bank 260 of MAC units will select the data to be processed and how the data is processed.

To illustrate how Symmetric Matrix Processing Element 200 stores and processes data, a set of examples of will be provided with reference to conceptual diagrams FIGS. 2B to 2E. The conceptual diagrams of FIGS. 2B to 2E illustrate a four-input system that uses a four-by-four weight matrix. Note that FIGS. 2B to 2E remove various circuit elements for clarity purposes.

FIG. 2B illustrates how a four by four weight matrix consisting of elements W[0,0] to W[3,3] is stored within the wide SRAM 230. The weight values in the weight matrix are stored in alignment with the underlying SRAM memory's row structure such that entire rows of weight values can be read out in a single memory cycle. For example, weight values W[0,0], W[0,1], W[0,2], and W[0,3] can be read out in a single memory cycle and provided simultaneously to the individual Multiply And Accumulate (MAC) units in the MAC bank 260 in parallel. The other operands for a computation may come from the operand register file 210 or from the operand bus (not shown in FIG. 2B).

It should be noted that the entire matrix operation only requires that the input data vector to be loaded once and the each of the weight matrix rows to be read once each such that only cycles are needed to perform the entire matrix operation. (The loading of the input data and the first weight matrix row can occur simultaneously.)

Forward Propagation in a Symmetric Matrix Processing Element

FIG. 2C conceptually illustrates how a Symmetric Matrix Processing Element 200 performs a standard matrix product operation used for inference tasks. Mathematically expressed, a matrix product is:

$$O[4\times1]=W[4\times4]\times I[4\times1]$$

The conceptual diagram of FIG. 2C will be described with reference to flow diagram FIG. 3. These examples presume that the proper weight values have already been loaded into the wide SRAM 230 in the proper locations as set forth in FIG. 2B.

Figure 3:
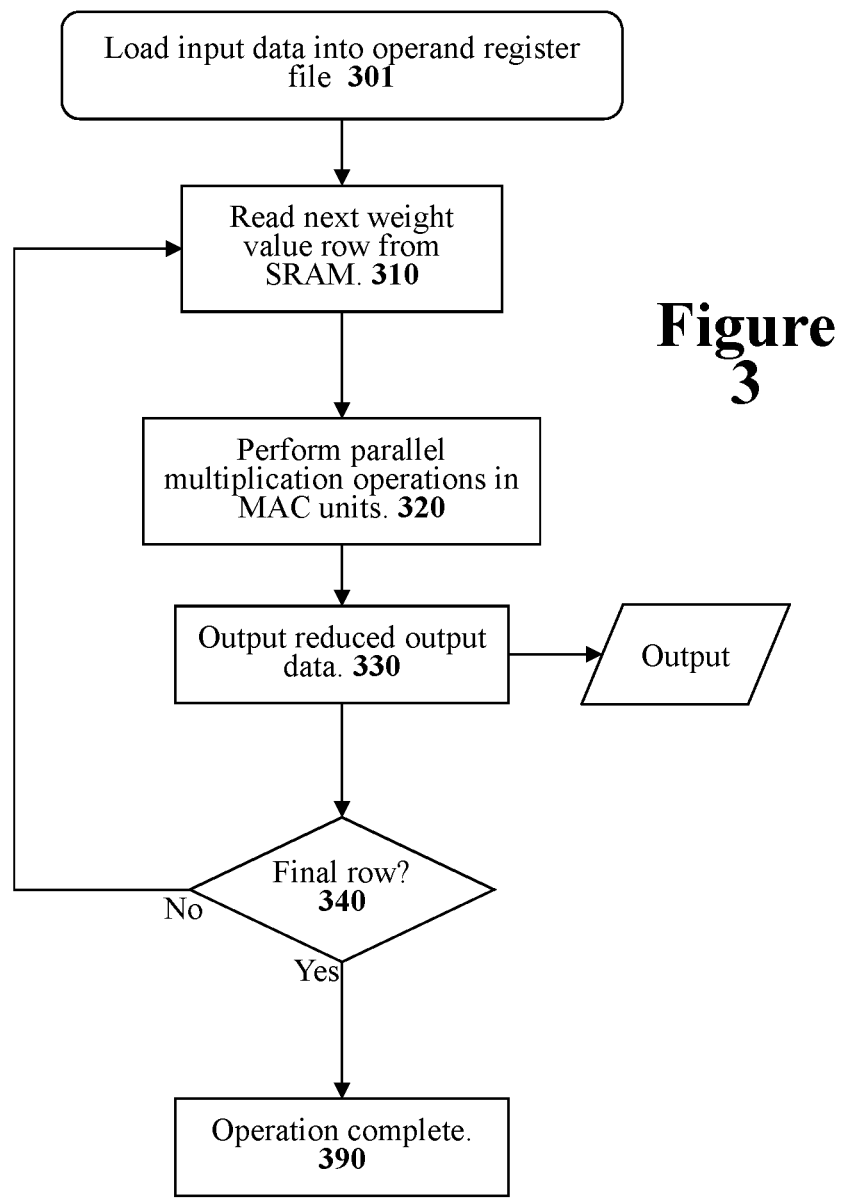
FIG. 3 illustrates a flow diagram for the Symmetric Matrix Processing Element of FIG. 2A performing a forward propagation calculation that may be used for artificial intelligence inferences.

Referring to flow diagram FIG. 3, the input data is first loaded into the operand register file 210 at stage 301. The input data may be read from the wide SRAM 230 or the input data may be obtained from the operand bus 221. Note that the input data is only loaded once and will be reused several times directly from the operand register file 210.

Next, at stage 310, the control system reads the next weight value row from the weight matrix stored the wide SRAM 230. The weight values read from this row are multiplied with the corresponding input data values from operand register file 210 within the Multiply and Accumulate (MAC) units in the MAC bank 260 at stage 320. Expressed mathematically, during each cycle i the following multiplication operations are performed:

$$W[i,0]*I[0], W[i,1]*I[1], W[i,2]*I[2], \text{ and } W[i,3]*I[3]$$

Note that in this multiply operation, the accumulate function of the Multiply and Accumulate (MAC) units is not used.

The result of the multiplication operations may be stored in the result register file 250 and made available on result bus 291. At stage 330, the multiplication results may be combined with the reduction tree 270 data is available on the reduce bus 295. Mathematically, the results of a reduction tree 270 in one particular embodiment for each cycle i are:

$$O[i]=(W[i,0]*I[0]+W[i,1]*I[1])+(W[i,2]*I[2]+W[i,3]*I[3])$$

Next, at stage 340, the system determines if the final row of the weight matrix stored the wide SRAM 230 has been reached. If not, the system returns to stage 310 in order to complete the operations of stages 310, 320, and 330 for the remaining rows in the weight matrix. At that point, the operation is completed at stage 390. The four outputs O[i] for each cycle represent the matrix product.

Back Propagation in a Symmetric Matrix Processing Element

Back propagation is where the Symmetric Matrix Processing Element 200 of the present excels compared to using a traditional GPU or other AI processors since the Symmetric Matrix Processing Element 200 allows the back propagation calculations to be performed just as fast as forward propagation calculations. Furthermore, these calculations can be performed without needing to move any of the weight values in the weight matrix.

Figure 2D:
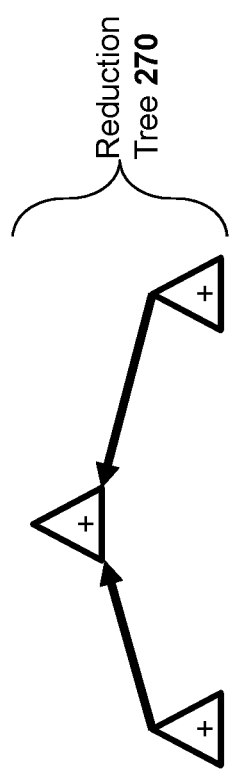
FIG. 2D illustrates a conceptual diagram of the Symmetric Matrix Processing Element of FIG. 2A performing an error back propagation calculation.
Figure 2D:
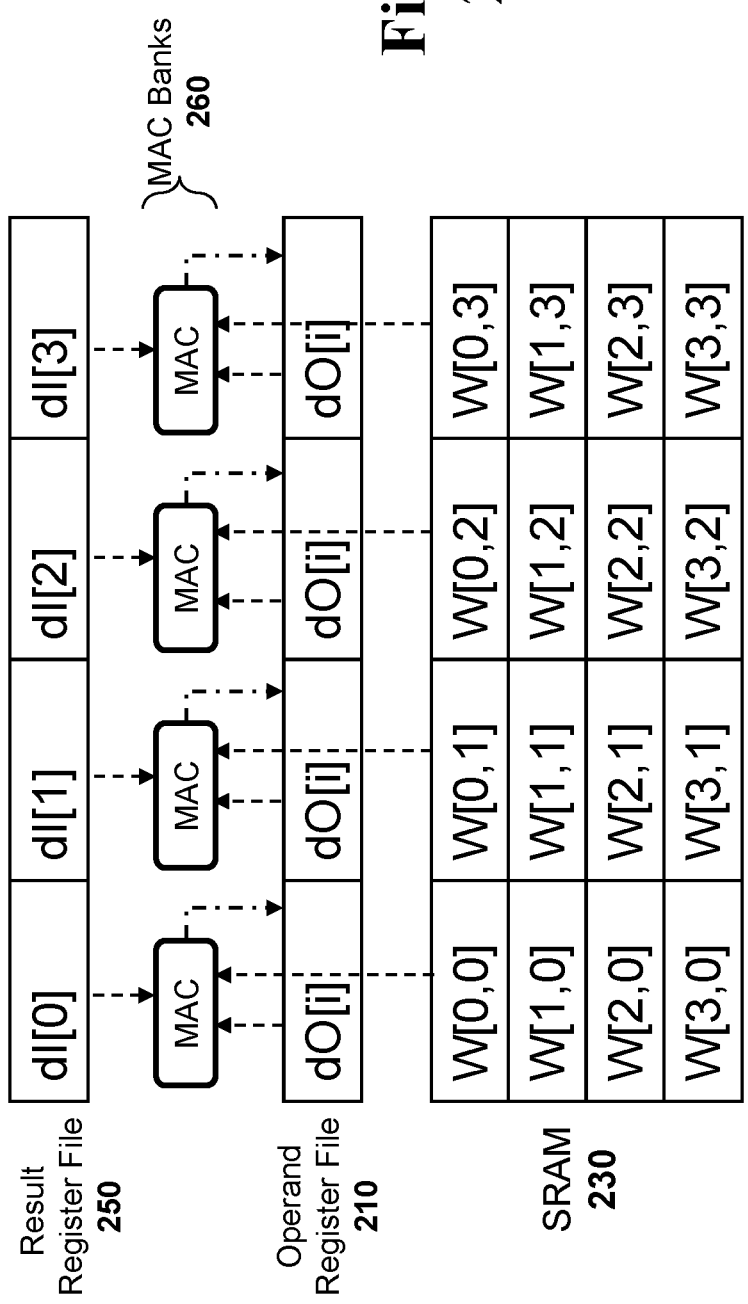

FIG. 2D conceptually illustrates how a Symmetric Matrix Processing Element 200 performs an error back propagation operation [is there a better term?] used for learning. Mathematically expressed, the back propagation operation is:

$$dI[4\times1]=W^T[4\times4]\times dO[4\times1]$$

Note that in this error back propagation operation, the weight matrix is transposed. In traditional AI processors (such as GPUs) this is accomplished by reloading the matrix weight values in the transposed manner. However, the Symmetric Matrix Processing Element 200 of the present document is able to perform the equivalent of the transpose by rearranging the way the calculations are performed in the Symmetric Matrix Processing Element 200. Specifically, partial results will be calculated for each individual column of the matrix and accumulated row by row over a set of computational cycles.

The conceptual diagram of FIG. 2D will be described with reference to flow diagram FIG. 4. Again, this example presumes that the proper weight values have already been loaded into the wide SRAM 230 in the proper locations as set forth in FIG. 2B.

Figure 4:
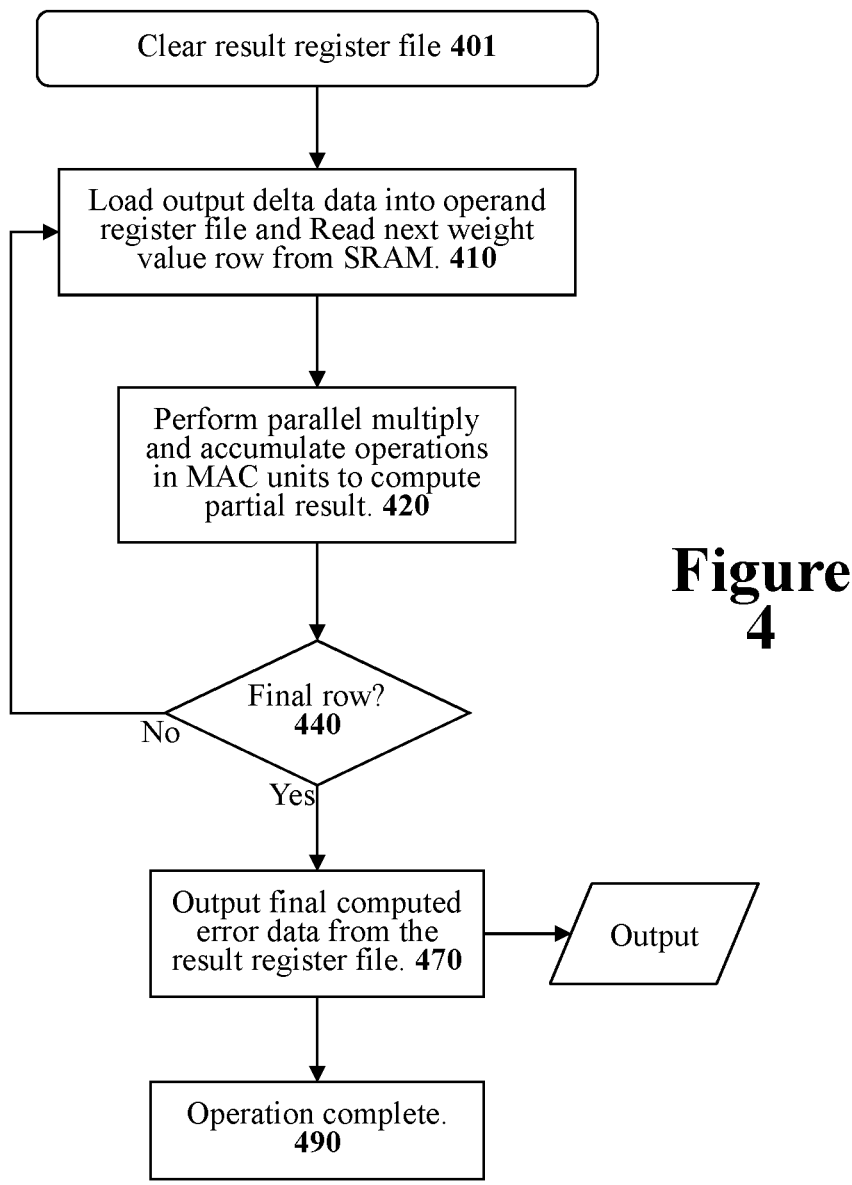
FIG. 4 illustrates a flow diagram of the Symmetric Matrix Processing Element of FIG. 2A performing an error back propagation calculation.

Referring to back propagation flow diagram FIG. 4, the result register file 250 is cleared at stage 401. Next, at stage 410, output layer error delta data is first loaded into the operand register file 210 and the control system reads the next weight value row from the wide SRAM 230. The output layer error delta data may be obtained from the operand bus 221. (The output layer error delta data may be read from the wide SRAM 230 but that may require an extra memory cycle.)

Next, at stage 420, the weight values read from the wide SRAM 230 are independently multiplied with the corresponding row output layer error delta data from the operand register file 210 within the Multiply and Accumulate (MAC) units in the MAC bank 260 at stage 320. In addition, the result of this multiplication is accumulated with the partial results currently stored in the result register file 250. This partial result is stored in the result register file 250. Each entry in the result register file 250 will accumulate partial dI[ ] array.

Mathematically expressed, these partial sums are computed throughout 4 cycles for column dI[0] as follows:

Cycle 1=>dI[0]=dI[0]+dO[0]*W[0,0]

Cycle 2=>dI[0]=dI[0]+dO[1]*W[1,0]

Cycle 3=>dI[0]=dI[0]+dO[2]*W[2,0]

Cycle 4=>dI[0]=dI[0]+dO[3]*W[3,0]

Columns dI[1], dI[2], and dI[3] are calculated simultaneously in parallel such that four delta values are calculated in four cycles. Each cycle performs an independent multiplication and accumulation operation for each column thus generating a partial result for each column. By working on columns independently instead of rows (as was done for the forward propagation), the back propagation operation is effectively being performed on a transposed weight matrix without having to physically transpose the weight matrix. This saves a significant amount of time and energy since the weight matrix does not need to be reloaded or transposed.

At stage 440, the control system determines if that was the final row. If not, then stages 410 and 420 are repeated until all of the partial results have been added into the result register file 250. Finally, at stage 470, the final error delta values can be read out of the result register file 250 on result bus 291. As illustrated, the error back propagation only requires four cycles just like the forward propagation computation. Note that the reduction tree 270 is not used in back propagation since the addition operation is performed by the accumulate function of the Multiply and Accumulate (MAC) units in the MAC bank 260.

Weight Updates in a Symmetric Matrix Processing Element

As errors are determined and back propagated, the weight values in the weight matrix should be updated to correct for these updates. This section will describe how the weight values in the weight matrix can be updated in parallel with simple efficient read, modify, and write operations.

FIG. 2E conceptually illustrates how a Symmetric Matrix Processing Element 200 updates the weight values stored in the weight matrix. The delta to change each weight is mathematically expressed as:

$$dW^T[4\times4]=I[4\times1]\times dO^T[1\times4]$$

Normally, a full delta matrix (dW$^T$[4×4]) would be calculated first and then that full delta matrix would be added to the current weight matrix with a matrix addition operation. But to most efficiently update each weight value in the weight matrix, the Symmetric Matrix Processing Element 200 updates the all the weight values one row at a time thus taking advantage of the ability for the wide SRAM 230 to access a full row at a time. The delta weight row to update weight values is a cross product of input data with error delta values at output layer. (The error delta values were calculated in the previous section of this document.)

The weight matrix update conceptual diagram of FIG. 2E will be described with reference to the weight matrix update flow diagram FIG. 5. Again, this example presumes that the proper weight values have already been loaded into the wide SRAM 230 in the proper locations as set forth in FIG. 2B.

Figure 5:
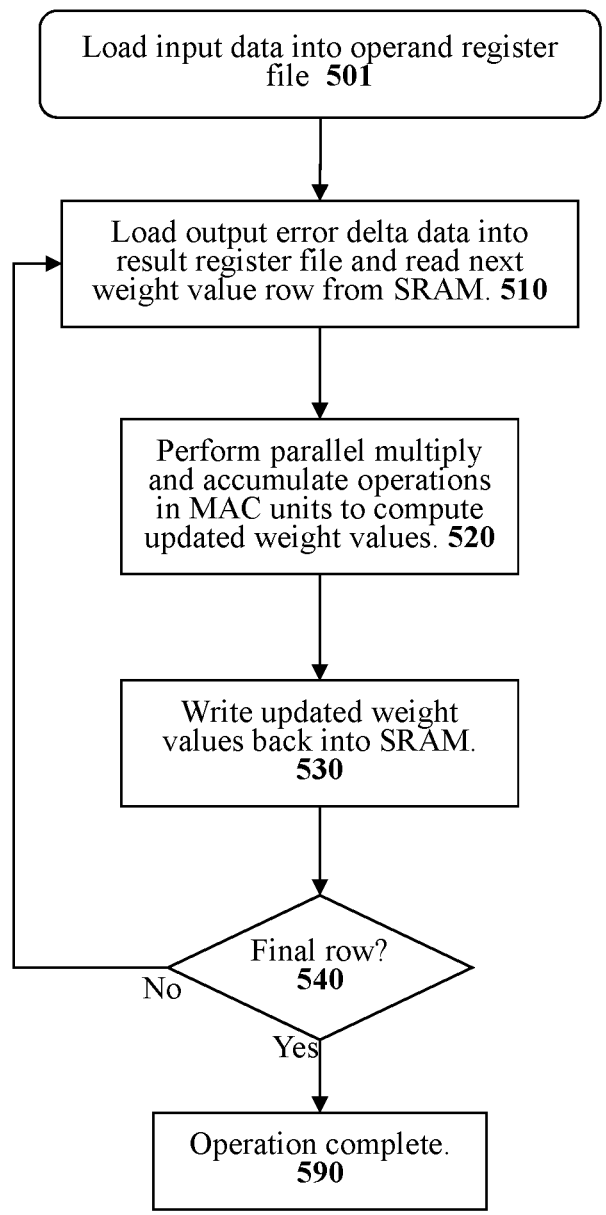
FIG. 5 illustrates a flow diagram of the Symmetric Matrix Processing Element of FIG. 2A performing a weight matrix update.

Referring to the weight matrix update flow diagram FIG. 5, the input data is first loaded into the operand register file 210 at stage 501. Next, at stage 510, a row of output error delta data dO$^T$[1×4] is loaded into the operand register file 210 and the control system reads the next weight value row from the wide SRAM 230. The output error delta data may be obtained from the operand bus 221. (The output error delta data may be read from the wide SRAM 230 but that may require an extra memory cycle.)

Next, at stage 520, the input data from the operand register file 210 are independently multiplied with the corresponding output error delta data from the result register file 250 within the Multiply and Accumulate (MAC) units in the MAC bank 260 at stage 520. In addition, the result of this multiplication operation is accumulated with the corresponding current matrix weight value read from the weight matrix. Finally, the updated weight values are written to the wide SRAM 230 at stage 530. Note that stages 510, 520, and 530 can comprise a specialized quick read, modify, write cycle for wide SRAM 230.

In this manner, each cycle computes a full row of updated weight values. Specifically, for the first column of the weight matrix (W[i,0]) the weights values are updated row by row as follows:

Cycle 1 => $W[0,0]=W[0,0]+dO[0]*I[0]$,

Cycle 2 => $W[1,0]=W[1,0]+dO[1]*I[0]$

Cycle 3 => $W[2,0]=W[2,0]+dO[2]*I[0]$

Cycle 4 => $W[3,0]=W[3,0]+dO[3]*I[0]$

The weight values in columns W[i,1], W[i,2], and W[i,3] are calculated simultaneously in parallel during the same four operation cycles. Each weight update cycle performs an independent multiplication and accumulation for each column thus updating a full row of matrix weight values each cycle. Again note that matrix weight values are not moved at all and are merely updated with a quick read, modify, and write memory operation.

At stage 540, the control system determines if that was the final row. If not, then stages 510, 520, and 530 are repeated until all of the rows in the weight matrix have been updated. Again, the matrix weight update operation only requires four cycles just like the forward and backward propagation cycles. Thus, all three common matrix operations used in artificial intelligence (forward propagation, back propagation, and weight matrix updates) only require four cycles each.

Symmetric Matrix Processing Element Variations

The Symmetric Matrix Processing Element 200 illustrated in FIG. 2A can be designed in various different manners and with various different options to accommodate different optimizations. Section will describe several of the optimizations that may be included. However, these example optimizations are just a small sampling of the many different optimizations that may be implemented for the Symmetric Matrix Processing Element 200.

Referring to FIG. 2A, the wide SRAM 230 is used to store weight matrix data. This weight matrix data may be stored in many different formats depending on the amount of precision required. For example, in low precision applications, simple 8-bit integer data may suffice. In other applications that require more precision, 16-bit or 32-bit floating point numbers may be used. Obviously, the rest of the components (Multiplexor banks 240, MAC bank 260, operand register file 210, result register file 250, etc.) would also need to be able to handle the same data widths. Furthermore, the various components may be able to handle multiple different data sizes and select that particular data size using control system 205.

Figure 6A:
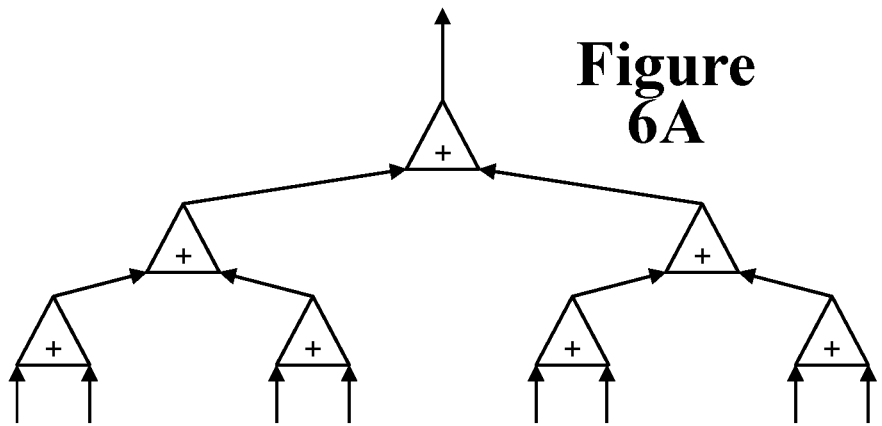
FIG. 6A illustrates an 8 to 1 reduction tree.
Figure 6B:
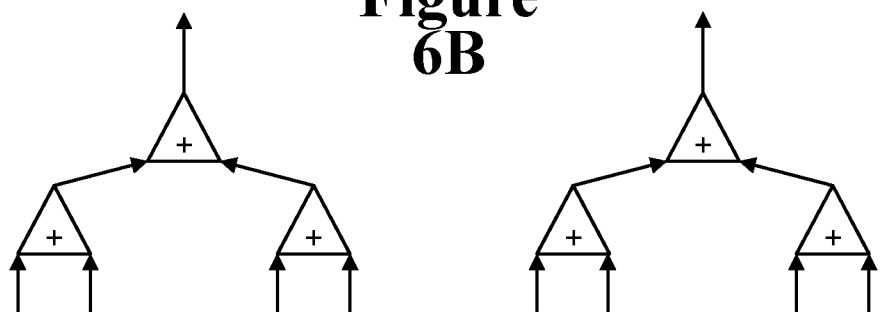
FIG. 6B illustrates an 8 to 2 reduction tree using a subset of the reduction tree in FIG. 6A.
Figure 6C:
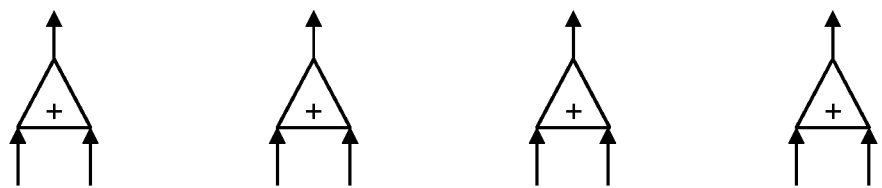
FIG. 6C illustrates an 8 to 4 reduction tree using a subset of the reduction tree in FIG. 6A.

For example, the reduction tree 270 can be used to perform multiple different types of data reductions. A reduction tree in simplest format does n-to-1 reduction. For example, FIG. 6A illustrates a simple 8 to 1 reduction. But the reduction tree output can be from any level. For example, FIG. 6B illustrates an 8-to-2 and FIG. 6C illustrates an 8-to-4 reduction. The outputs from reduction trees illustrated in FIG. 6A, FIG. 6B, and FIG. 6C may be sent on the result bus 291, the reduce bus 295 or stored in result register file 250 for further usage. This flexibility is useful for low dimensionality sizes, (e.g., convolutions, small matrix).

The operand register file 210 and/or the result register file 250 may have multiple entries. For example, FIG. 2F illustrates an embodiment with a three entry deep operand register file 210 and a three entry deep result register file 250. These multiple entries can be used to cache partial sums locally instead of sending off unit. In this manner, results can be kept locally and quickly used for later operations. For example, during error back propagation calculations, a several entry deep result register file 250 can store multiple delta error values. These stored delta error values can then be quickly accessed for later matrix weight update operations.

The Symmetric Matrix Processing Element 200 can be designed with precision flexibility. Specifically, the MAC units in MAC bank 260, the reduction tree 270, and all of the other circuits can be designed to handle precision flexibility such that different data sizes may be used. Furthermore, all of the different parts of the circuits may operate on same precision level or on different precision levels. In this manner, increased precision may be obtained by not dropping digits during multiply operations. Alternatively, data can be reduced by quantizing data after calculations have been performed.

Note that as the number of bits required for precision decreases, number of multipliers that may be used can increase. For example, a Symmetric Matrix Processing Element 200 may be designed to be able to handle 16-bit floating point data values and have 4 MAC units in MAC bank 260. But the same unit may be configured to operate 8-bit floating point (or integer) operation and thus use 8 4 MAC units in MAC bank 260.

Figure 2G:
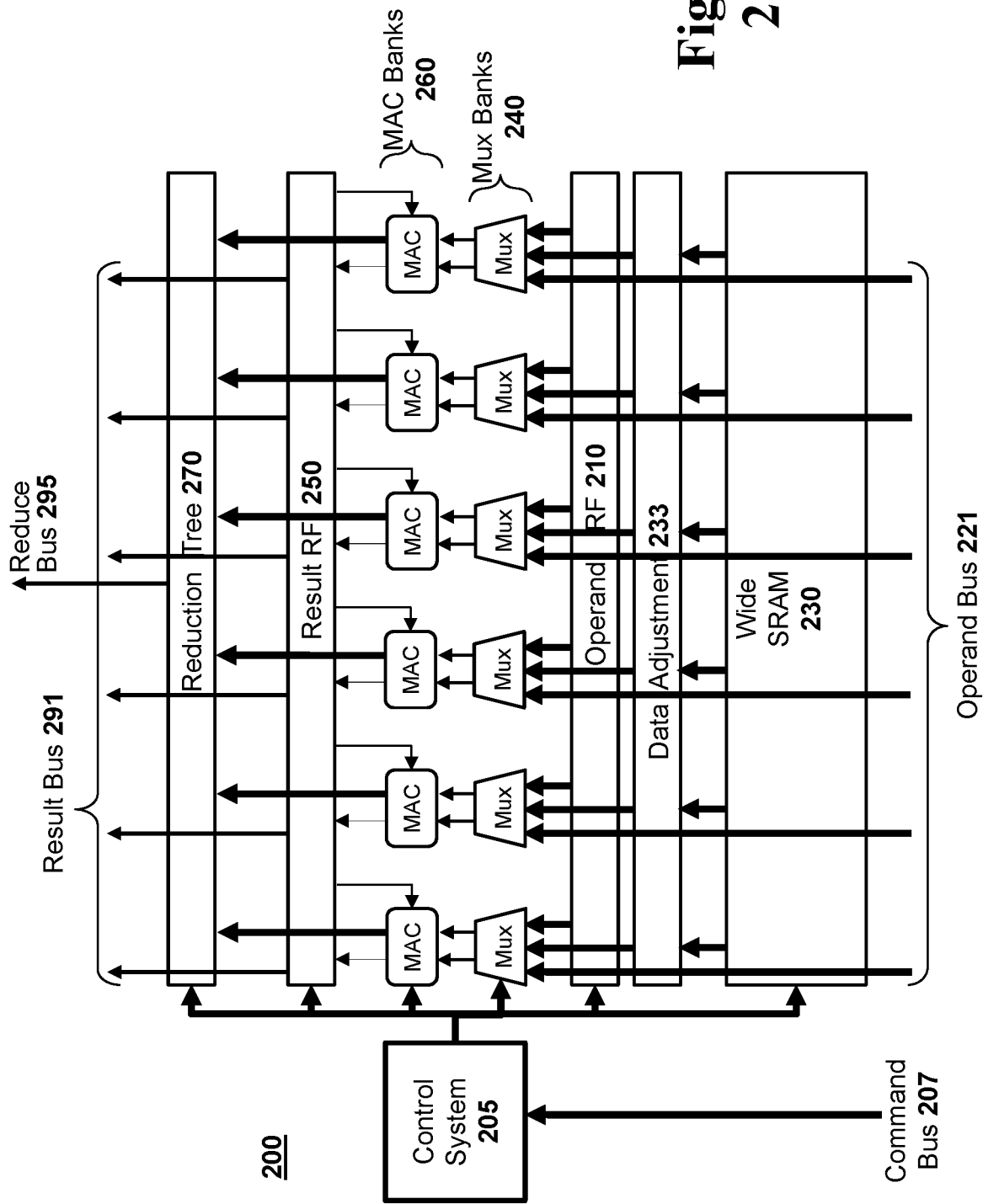
FIG. 2G illustrates a diagram of an embodiment of the Symmetric Matrix Processing Element of FIG. 2A with a data adjustment layer.

To adapt to different data formats, a data adjustment layer may be added into the Symmetric Matrix Processing Element 200. FIG. 2G illustrates a Symmetric Matrix Processing Element 200 with a data adjustment layer 233 added in between the wide SRAM 230 and the multiplexor banks 240. The data adjustment layer 233 can be used to adjust data being read from the wide SRAM 230 or before data is stored back to the wide SRAM 230.

The data adjustment layer 233 can be used to implement many different types of data adjustments. For example, the data adjustment layer 233 Compress/Decompress data accessed in the wide SRAM 230. In secure applications the data adjustment layer 233 may Encrypt/Decrypt data.

As set forth above, various implementations may use different data precision levels. Thus, the data adjustment layer 233 may expand precision or lower precision levels, change number encoding formats, or perform any other data conversion needed.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain- English equivalents of the respective terms "comprising" and "wherein." Also, in the following claims, the terms "including" and "comprising" are open-ended, that is, a system, device, article, or process that includes elements in addition to those listed after such a term in a claim is still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A method of digitally performing matrix operations in a single digital processing circuit, said method comprising:
    performing forward propagation calculations by:
        reading a row of matrix weight data from a memory circuit;
        multiplying said row of matrix weight data with an input vector in a plurality of parallel arithmetic logic units to produce an output vector; and
        storing said output vector in result register file; and
    performing back propagation calculations by:
        reading a row of matrix data from said memory circuit;
        independently multiplying said row of matrix data with a delta output error vector in a plurality of parallel arithmetic logic units and accumulating partial results to produce a delta input vector; and
        storing said delta input vector in said result register file.

2. The method of digitally performing matrix operations as set forth in claim 1, said method further comprising:
    reducing said output vector in said result register file with a reduction tree circuit.

3. The method of digitally performing matrix operations as set forth in claim 2 wherein said reduction tree circuit creates a sum of values in said result register file.

4. The method of digitally performing matrix operations as set forth in claim 2 wherein said reduction tree circuit creates a set of sums from values in said result register file.

5. The method of digitally performing matrix operations as set forth in claim 1, said method further comprising:
    performing weight matrix updates by:
        loading a row of input data into an operand register;
        reading said row of matrix data from said memory circuit,
        reading a row of output error delta data;
        independently multiplying said row of input data with said row of output error delta data in a plurality of parallel arithmetic logic units and accumulating multiplication results to said row of matrix data; and
        storing said row of matrix data back to said memory circuit.

6. The method of digitally performing matrix operations as set forth in claim 1 wherein said result register file stores multiple different sets of result data values.

7. The method of digitally performing matrix operations as set forth in claim 1 wherein said single digital processing circuit processes 8-bit integer values.

8. The method of digitally performing matrix operations as set forth in claim 1 wherein said single digital processing circuit processes 16-bit floating point values.

9. The method of digitally performing matrix operations as set forth in claim 1 wherein said single digital processing circuit processes 32-bit floating point values.

10. The method of digitally performing matrix operations as set forth in claim 1 wherein a control system further updates said row of matrix weight data using a read, modify, write operation.

* * * * *

UNITED STATES PATENT AND TRADEMARK OFFICE
CERTIFICATE OF CORRECTION

PATENT NO. : 11,983,616 B2
APPLICATION NO. : 16/149054
DATED : May 14, 2024
INVENTOR(S) : Sharad Vasantrao Chole; Shang-Tse Chuang and Siyad Chih-Hua Ma It is certified that error appears in the above-identified patent and that said Letters Patent is hereby corrected as shown below:

In the Claims

In Column 12, Lines 14-15 (Claim 5):
The phrase: "reading said row of matrix data from said memory circuit,"
Should read: "reading said row of matrix data from said memory circuit;".

Signed and Sealed this
Twentieth Day of August, 2024

Katherine Kelly Vidal
*Director of the United States Patent and Trademark Office*